United States Patent [19]

Menut et al.

[11] Patent Number: 5,408,666
[45] Date of Patent: Apr. 18, 1995

[54] METHOD AND APPARATUS FOR LOADING A PROGRAM INTO A PROGRAM MEMORY FROM A MAILBOX OR AN EXTERNAL ROM

[75] Inventors: Patrick Menut, Echirolles; Charles Odinot, La Tronche, both of France

[73] Assignee: SGS-Thomson Microelectronics S.A., Gentilly, France

[21] Appl. No.: 75,631

[22] Filed: Jun. 11, 1993

[30] Foreign Application Priority Data

Jun. 19, 1992 [FR] France ................... 92 07509

[51] Int. Cl.⁶ .................. G06F 9/445; G06F 13/00
[52] U.S. Cl. .................. 395/700; 364/DIG. 1; 364/280.2; 364/280.3; 364/222.2; 364/241.7; 364/475.2
[58] Field of Search .................. 395/700, 200

[56] References Cited

U.S. PATENT DOCUMENTS

| | | | |
|---|---|---|---|
| 4,430,704 | 2/1984 | Page et al. | 364/DIG. 1 |
| 5,068,780 | 11/1991 | Bruckert et al. | 395/700 |
| 5,247,659 | 9/1993 | Curran et al. | 395/575 |

OTHER PUBLICATIONS

Electronics & Wireless World, vol. 94, No. 1626, Apr. 1988, Surrey, GB, pp. 344–345, J. Cooke "Z80 Bootstrapping and Communication Interface".

Datebase WPIL, Week 9004, Derwent Publications Ltd., London, GB, AN 90-029493 & TP 128901 (Anon).

Primary Examiner—Eddie P. Chan
Attorney, Agent, or Firm—Wolf, Greenfield & Sacks

[57] ABSTRACT

A processor has a local data bus to which an external read-only memory and a mailbox for exchanging data with a host computer may be connected. The processor is re-initialized, and a series of instructions is executed to write a program to be loaded into a program memory. The series of instructions includes an initial test of a state of the mailbox to determine whether data has been written to the input register of the mailbox from the host computer during the activation of the re-initialization signal. Depending on the results of this initial test, the program to be loaded is read either from the input register of the mailbox, or from the external read-only memory through the local data bus.

10 Claims, 2 Drawing Sheets

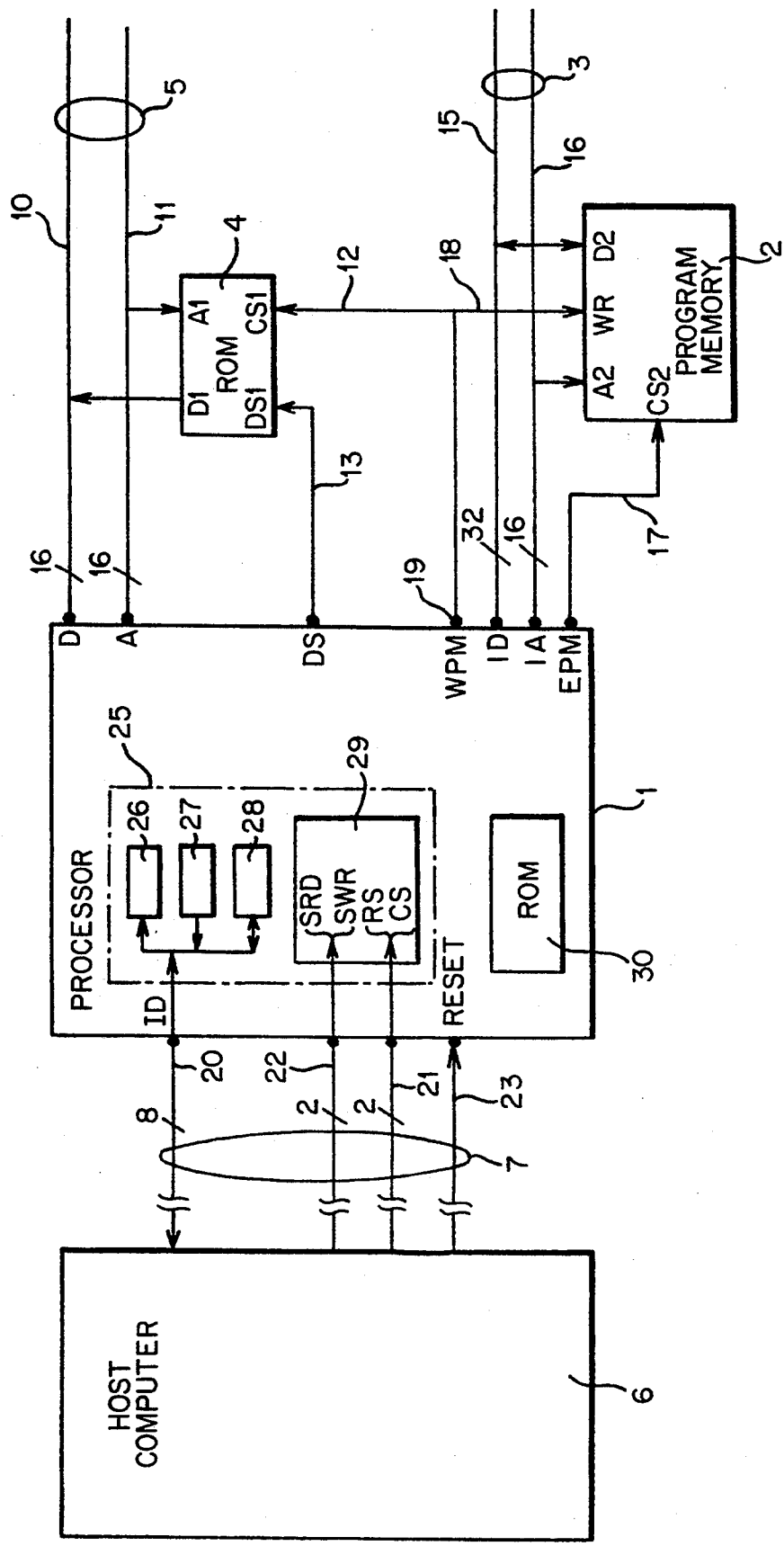
FIG_1

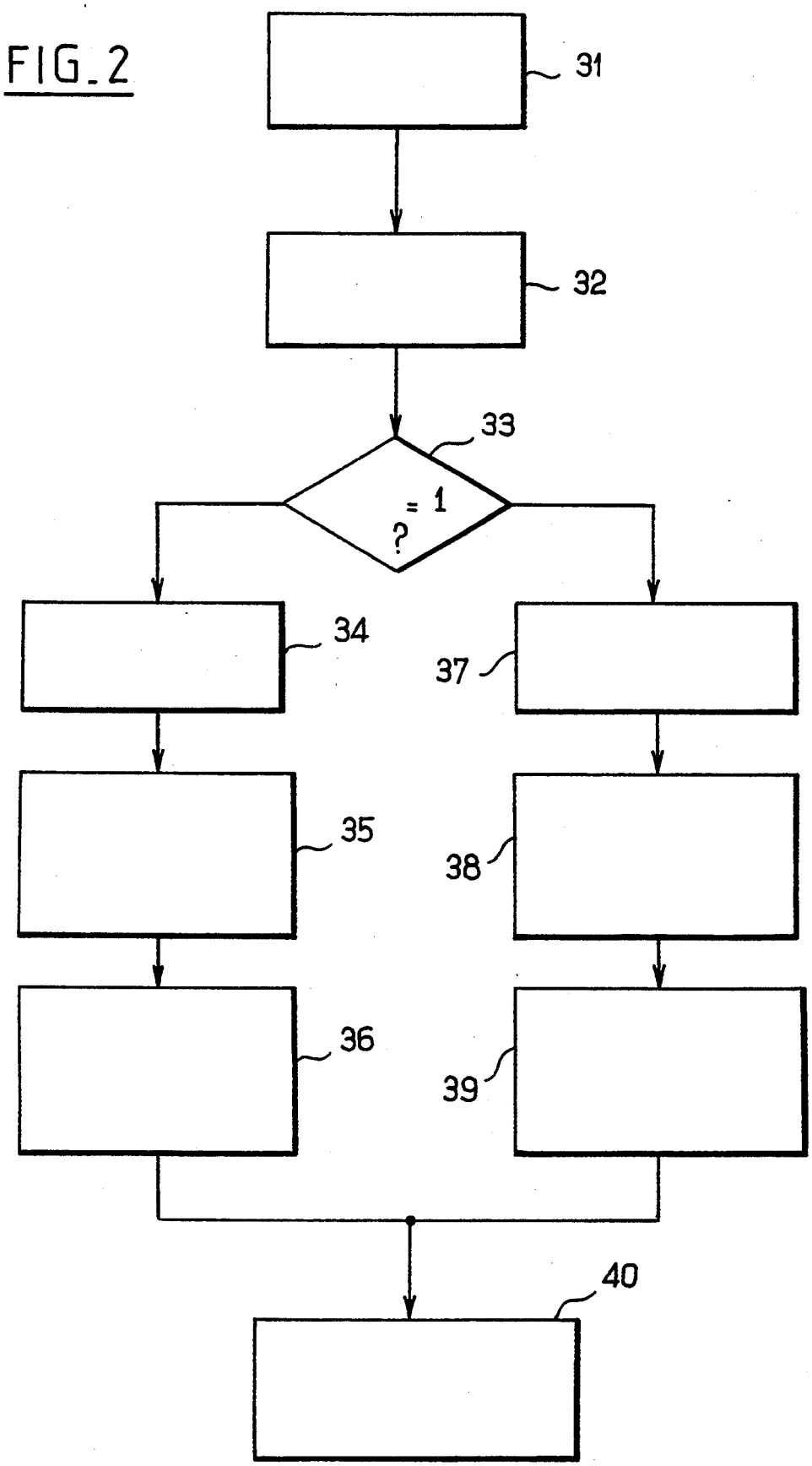

METHOD AND APPARATUS FOR LOADING A PROGRAM INTO A PROGRAM MEMORY FROM A MAILBOX OR AN EXTERNAL ROM

FIELD OF THE INVENTION

The present invention relates to a method for loading a program into a program memory associated with a processor. The invention applies to a processor, such as a signal processor (DSP), for which the program to be loaded and to be executed may either be read from a read-only memory (ROM) external to the processor, or supplied to the processor by a host computer.

DISCUSSION OF RELATED ART

The choice between these two modes of loading is customarily open to the user of the processor. The user may record his program to be executed in a read-only memory, for example of the EPROM type, or he may prefer, especially in the design and development phases of his program, that the latter be loaded from a host computer such as a microcomputer.

In order to select the mode of loading, the user must customarily install external wiring between particular pins of the circuit including the processor. The program for booting and loading (bootstrap) the processor then begins by testing the logic states of these particular pins in order to determine whether the program to be executed must be loaded from the external read-only memory or from the host computer. This method is in particular applied by the signal processor marketed by the MOTOROLA company under the label DSP56116.

For the user, the process of having to install components such as jumpers between pins of the circuit is neither convenient nor reliable. For the designer of the circuit, this introduces the disadvantage of having to provide the pins dedicated to the loading mode selection function.

SUMMARY OF THE INVENTION

The aim of the present invention is to remedy these disadvantages by providing for a method requiring no external wiring for selecting the mode of loading of the program to be executed by the processor.

According to the invention, this aim is achieved with a method for loading a program into a program memory associated with a processor, the processor comprising a local data bus to which may be connected an external read-only memory containing a program, and a mailbox for exchanging data with a host computer via an external data bus, in which the processor is re-initialised by activating a re-initialisation signal (RESET) and, after having deactivated the re-initialisation signal (RESET), a series of instructions is executed in order to write the program to be loaded into the program memory, wherein said series of instructions comprises an initial test of the state of the mailbox in order to determine whether data have been written to an input register of the mailbox from the host computer during the activation of the re-initialisation signal (RESET), and wherein, depending on the result of this initial test, the program to be loaded is read either from the input register of the mailbox, or from the external read-only memory via the local data bus.

The selection of the source of the program to be loaded is thus made through a logical test which requires no wiring external to the circuit.

Preferably, the series of loading instructions is such that, if the host computer has written to the input register of the mailbox during the re-initialisation phase, the program will be loaded from the host computer via the external bus and the mailbox 25, whereas, in the opposite case, the program will be loaded from the external read-only memory.

BRIEF DESCRIPTION OF THE DRAWINGS

Other features and advantages of the invention will emerge in the description below of a preferred and non-limiting exemplary embodiment, read conjointly with the attached drawings, in which:

FIG. 1 is a diagram illustrating the environment of a processor implementing the method according to the invention; and FIG. 2 is a flowchart representing the instructions for booting and loading the processor.

DESCRIPTION OF THE PREFERRED EMBODIMENT

FIG. 1 shows a signal processor (DSP) 1 implementing the invention. The processor 1 may, for example, be of the ST18942 type marketed by the SGS-THOMSON MICRO-ELECTRONICS company. The processor 1 is connected to a program memory 2 of the direct-access type (RAM) via an instruction bus 3, to an external read-only memory 4 of the programmable type (EPROM) via a local bus 5, and to a host computer 6 via a system bus 7. Of course, other peripheral devices (memories, interfaces, etc.) may be attached to the instruction bus 3 or to the local bus 5 of the processor 1, depending on the mode of operation of the processor 1.

The local bus 5 comprises a 16-bit data bus 10 and a 16-bit address bus 11 which are connected to the external read-only memory 4. Conventionally, the memory 4 is moreover connected to the processor 1 by a selection line 12 and a synchronization line 13. In order to read 16-bit data from the memory 4 via the local data bus 10, the processor 1 delivers a signal CS1 of logic level 0 on the selection line 12, synchronization pulses DS1 on the synchronization line 13 and a 16-bit address A1 on the local address bus 11.

The instruction bus 3 comprises a 32-bit data bus 15 and a 16-bit address bus 16 which are connected to the program memory 2. The memory 2 is furthermore connected to the processor 1 by a selection line 17 and a control line 18. In order to write 32-bit data into the program memory 2 via the data bus 15, the processor 1 delivers a signal CS2 of logic level 0 on the selection line 17, a signal WR of logic level 0 on the control line 18 and a 16-bit address A2 on the address bus 16. In order to read 32-bit data from the program memory 2 via the data bus 15, the processor delivers a signal CS2 of logic level 0 on the selection line 17, a signal WR of 1 logic level on the control line 18 and a 16-bit address A2 on the address bus 16.

In the example represented, the selection line 12 of the external read-only memory 4 and the control line 18 of the program memory 2 are connected to the same port 19 of the processor 1 delivering a binary signal WPM=CS1=WR. This is because the external read-only memory 4 contains a program intended to be loaded into the program memory 2: when the read-only memory 4 is selected (CS1=0), the program memory 2 can function only in write mode (WR=0).

The host computer 6 may, for example, be a processor of the 80306 type marketed by the INTEL company. The system bus 7 comprises an 8-bit external data bus 20, a 2-bit address bus 21, a 2-bit control bus 22 and a re-initialisation control line 23.

For data exchange with the host computer 6, the processor 1 comprises a mailbox 25 including an input register 26, an output register 27, a state register 28 and a control circuit 29. The input register 26 and the output register 27 are two registers of first-in, first-out (FIFO) type each capable of containing 16 words of 8 bits. Access to these two registers 26, 27 is shared between the processor 1 and the host computer 6 via the external data bus 20. The state register 28 is a register with 6 bits RINE, RINF, ROUE, ROUF, RISH, ROSH representing the states indicated in Table I

TABLE I

| BIT | VALUE | MEANING |
| --- | --- | --- |
| RINE | 1 | Input register 26 empty |
| RINE | 0 | Input register 26 not empty |
| RINF | 1 | Input register 26 full |
| RINF | 0 | Input register 26 not full |
| ROUE | 1 | Output register 27 empty |
| ROUE | 0 | Output register 27 not empty |
| ROUF | 1 | Output register 27 full |
| ROUF | 0 | Output register 27 not full |
| RISH | 1 | Access by the processor 1 to the input register 26 |
| RISH | 0 | Access by the host computer 6 to the input register 26 |
| ROSH | 1 | Access by the processor 1 to the output register 27 |
| ROSH | 0 | Access by the host computer 6 to the output register 27 |

The state register 28 is connected to six of the eight conductors of the external data bus 20 so that the host computer 6 may read or write information from or to this register 28.

The control circuit 29 of the mailbox 25 manages the accesses to the input and output registers 26,27 according to a conventional protocol. It receives the two address bits RS, CS transmitted by the host computer 6 via the address bus 21 and the two control bits SRD, SWR transmitted by the host computer 6 via the control bus 22. The control bits SRD, SWR serve for the host computer 6 to control respectively a reading from (SRD=0) or a writing to (SWR=0) the mailbox 25. The address bit CS serves for the host computer 6 to select the mailbox 25 (CS=0) from among the other interfaces which may be attached to the system bus 7. The address bit RS serves for the host computer to indicate whether it must exchange information with the state register 28 (RS=1) or with one of the input and output registers 26, 27 (RS=0). The control circuit 29 also comprises a counter for managing the values of the bits RINE, RINF, ROUE and ROUF of the state register 28.

The re-initialisation control line 23 serves to carry a binary re-initialisation signal RESET which is active in the 0 state and inactive in the 1 state. This re-initialisation signal RESET is addressed to the processor 1 by the host computer 6 in order to re-initialise the processor 1. As regards the mailbox 25, the start of the activation of the re-initialisation signal (falling edge of RESET) has the effect of forcing the bits RINE, ROUE of the state register 28 to the value 1 (input register 26 and output register 27 both empty), of forcing the bits RINF, ROUF of the state register 28 to the value 0 (input register 26 and output register 27 not full), and of forcing the bits RISH, ROSH of the state register 28 to the value 0 (access by the host computer 6 to the input register 26 and output register 27).

The system bus may of course include other lines (which are not represented since they are not directly concerned in the invention) for exchanging signals example acknowledge or interrupt signals.

Two sources are possible for loading the program to be executed by the processor 1 into the program memory 2: the host computer 6 via the external data bus 20 or the external read-only memory 4 via the local data bus 10.

According to the invention, in order to select the source of the program to be loaded, the state of the mailbox 25 is tested after having activated and deactivated the re-initialisation signal RESET, in order to determine whether the host computer 6 has written data to the input register 26 during the activation of the re-initialisation signal RESET.

If the program to be executed is to be loaded from the host computer 6 (choice open to the user of the system), the user programs the host computer 6 in such a way that it performs the following operations:

a—activation of the re-initialisation signal (RESET=0);

b—during this activation of the RESET signal, writing of data to the input register 26 of the mailbox 25 (CS=0, RS=0, SWR=0, SRD=1 and presentation of data on the bus 20);

c—after these data have been written to the register 26, writing of the value 1 to the location of the state register 28 corresponding to the bit RISH (CS=0, RS=1, SWR=0, SRD=1 and presentation of a data item on the bus 20 with the value 1 for the bit RISH); and RISH); and d—deactivation of the re-initialisation signal (RESET=1).

If the program to be executed is to be loaded from the external read-only memory 4, the host computer sends only one re-initialisation pulse RESET of logic level 0 in order to re-initialise the processor 1 without writing data to the mailbox 25.

At the end of the activation of the re-initialisation signal (rising edge of RESET), the processor 1 executes a series of booting and loading instructions (bootstrap) stored in an internal read-only memory (ROM) 30 of the processor 1. This series of instructions is illustrated in FIG. 2. It includes an initial test of the state of the mailbox 25 in order to determine whether data have been written to the input register 26 from the host computer 6 during the preceding activation of the re-initialisation signal RESET. More precisely, after deactivation (rising edge) of the RESET signal (step 31), the processor 1 reads the bit RINE of the state register 28 of the mailbox 25 (step 32), then determines whether this bit RINE has the value 1 (step 33).

If so, that is to say if the input register 26 is empty, the host computer 6 having written nothing thereto during the activation of the RESET signal, the program to be loaded and be executed is read from the external read-only memory 4 via the local data bus 10, as indicated by block 34 in FIG. 2. The reading of the program to be executed from the external read-only memory 4 and its transfer to the program memory 2 are then carried out in a conventional manner. Typically, the data stored in the read-only memory 4 including the program to be executed comprise a header indicating in particular the format and the number of words of the program to be loaded. This header is firstly read (step 35), then the program proper is read and transferred to the program memory 2 (step 36).

If at step 33 it is determined that the bit RINE equals 0, that is to say if the input register 26 is not empty, since the host computer 6 has written data thereto during the activation of the RESET signal, the program to be loaded and to be executed is read from the input register 26 of the mailbox 25, as indicated by block 37 in FIG. 2. The reading from the mailbox 25 of the program to be executed originating from the host computer 6 and its transfer to the program memory 2 are then carried out in a conventional manner according to the protocol managing access to the mailbox 25. The processor executes steps 38, 39 functionally analogous to the loading steps 35, 36 carried out in the case where the program is read from the external read-only memory 4.

Once the program has been completely loaded into the memory 2 (or partially loaded if only certain parts of the program are to execute), the processor 1 quits the series of loading instructions in order to commence execution of the loaded program (step 40).

The selection between the two possible sources of the program to be executed is carried out last, according to the invention, without requiring external wiring between special pins of the processor 1.

In the case where the program to be loaded is read from the input register 26 of the mailbox 25, the data written to the input register 26 by the host computer 6 during the activation of the re-initialisation signal RESET advantageously include certain elements serving for the loading of the program into the program memory 2, for example a part of the header or the whole of the header accompanied by the first of the instructions of the program proper. These elements may then be considered directly during the loading steps 38 and/or 39. As a variant, the host computer 6 can write arbitrary data to the register 26 when RESET=0, these data then being ignored by the loading instructions 38, 39.

Although the invention has been described with reference to a preferred exemplary embodiment, it will be understood that this example is not limiting and that various modifications may be made thereto without departing from the scope of the invention.

Thus, the direct-access program memory 2 has been represented as being external to the processor 1, but it may, as a variant, be a RAM memory internal to the processor 1. Again, the series of booting and loading instructions have been described as being stored in an internal read-only memory of the processor 1, but this series of instructions may also be stored in large part in an external read-only memory (ROM) attached to the instruction bus 3, the internal memory 30 then including an instruction for branching to the appropriate address of this external memory.

Furthermore, although this is not the preferred version of the method, it would be possible to envisage inverting the logic of the test step 33 by providing for the loading of the program from the external read-only memory if the host computer has written to the input register of the mailbox during the activation of the re-initialisation signal, and the loading of the program from the host computer in the opposite case.

What is claimed is:

1. A method for loading one of a first and second program into a program memory associated with a processor, the processor comprising a local data bus to which an external read-only memory containing the first program is coupled, and a mailbox for exchanging data with a host computer via an external data bus, the mailbox having an input storage element, the host computer containing the second program, the method comprising the processor implemented steps of:
   (a) receiving a reinitialization signal from the host computer, the reinitialization signal being activated to indicate an activated state and deactivated to indicate a deactivated state;
   (b) when the reinitialization signal is deactivated, checking a status element in the mailbox to determine whether the second program has been written to the input storage element of the mailbox from the host computer during a preceding activated state of the reinitialization signal;
   (c) loading the second program from the input storage element into the program memory when the second program has been written to the input storage element of the mailbox; and
   (d) loading the first program from the external read-only memory via the local data bus into the program memory when the status element indicates that the second program has not been written to the input storage element of the mailbox.

2. The method as claimed in claim 1, wherein the status element includes a state register having a bit, a first value of which represents an empty state of the input storage element and a second value of which indicates a non-empty state of the input storage element, the bit being forced to the first value at a start of the activation of the reinitialization signal, and wherein step (b) includes reading the bit.

3. The method as claimed in claim 1, wherein the status element includes a state register having a bit, a first value of which indicates that the host computer has access to the input storage element, and a second value of which indicates that the processor has access to the input storage element, the bit being forced to its first value at a start of the activation of the reinitialization signal, wherein when the second program has been written to the input storage element from the host computer during the activation of the reinitialization signal, the method further comprises the host computer implemented step of toggling the second value.

4. The method as claimed in claim 1, wherein, when the program to be loaded is read from the input register of the mailbox, the host computer during the activation of the re-initialisation signal comprises elements for loading the program into the program memory.

5. The method as claimed in claim 1, wherein steps (b)–(d) include executing a series of instructions stored in an internal memory of the processor.

6. The method of claim 1, wherein step (d) is performed automatically in response to a determination that data has not been written into the mailbox.

7. A computer system comprising:
   a memory storing a first program;
   a host computer storing a second program; and
   a processor including:
      a local data bus to which the memory is connected,
      a mailbox coupled to the host computer by an external data bus, the mailbox having an input storage element and a status element,
      an input lead coupled to the host computer for receiving a reinitialization signal that is activated and deactivated by the host computer,
      means for checking the status element when the reinitialization signal is deactivated to determine whether the second program has been written to the input storage element of the mailbox from the host computer during a preceding activated state of the reinitialization signal; and means for loading the second program from the input storage element of the mailbox into a program memory when data has been written to the input storage element, and for loading the first program into the program memory from the memory via the local data bus when data has not been written to the input storage element.

8. The system of claim 7, wherein the status element includes a register having a bit settable to a first value which indicates an empty state of the input storage element, and a second value which indicates a non-empty state of the input storage element, wherein the system includes means for forcing the bit to its first value at the start of the activation of the reinitialization signal, and wherein the means for checking the mailbox is coupled to the register to read the bit to determine a state of the input storage element.

9. The apparatus of claim 7, wherein the means for loading automatically loads the first program in response to a determination by the checking means that data has not been written into the mailbox.

10. A method for loading one of a first and second program into a program memory associated with a processor, the processor comprising a local data bus to which an external memory containing the first program is coupled, a mailbox having an input storage element, and a state storage element, wherein the host computer stores the second program, the host computer being coupled to the input storage element through an external data bus for writing the second program to the input storage element, wherein a state of the state storage element is determined by the host computer during an activated state, the method comprising the steps of:

(a) providing, by the host computer, a reinitialization signal to the processor, the signal being activated to indicate the activated state and deactivated to indicate a deactivated state, the host computer for conditionally writing the second program to the input storage element and causing the state storage element to have one of a first value and a second value during the activated state;

(b) when the reinitialization signal is deactivated, checking, by the processor, the state storage element;

(c) loading the second program into the program memory when the state storage element has the first value; and (d) loading the first program from the external memory via the local data bus into the program memory when the state storage element has the second value.

* * * * *